UNITED STATES PATENT OFFICE.

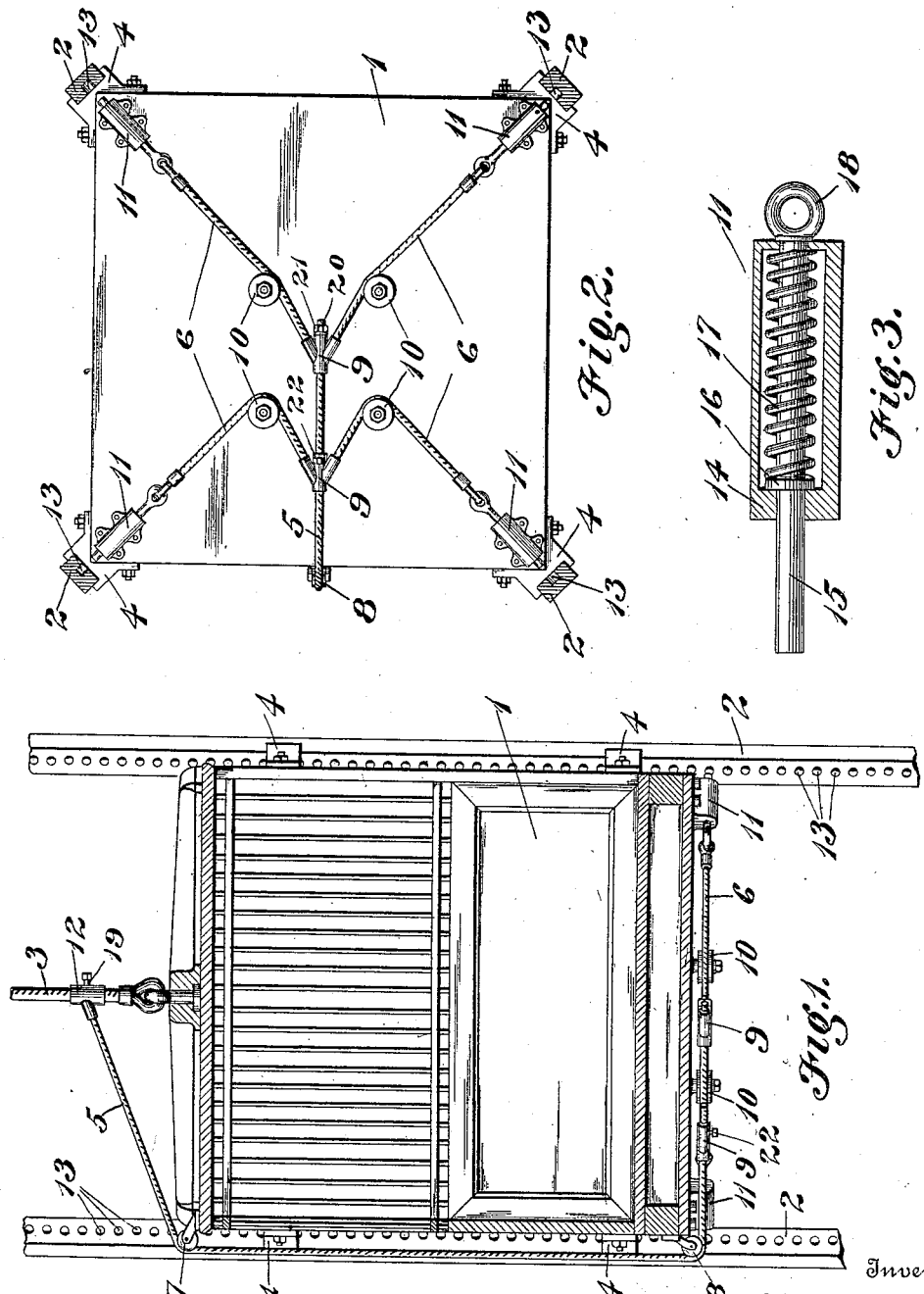

OTTO VOLZ, OF OMAHA, NEBRASKA.

SAFETY DEVICE FOR ELEVATORS.

1,076,085.  Specification of Letters Patent.  Patented Oct. 21, 1913.

Application filed May 17, 1912. Serial No. 698,043.

*To all whom it may concern:*

Be it known that I, OTTO VOLZ, a citizen of the United States, residing at Omaha, in the county of Douglas and State of Nebraska, have invented new and useful Improvements in Safety Devices for Elevators, of which the following is a specification.

This invention relates to safety devices for elevators and has for an object to provide cable controlled means to be operated to normally hold latch devices of the cage in retracted positions and to permit said devices to be immediately extended to cage stopping and sustaining position on breakage of the hoisting cable.

In the drawing forming a portion of this application, and in which like letters of reference indicate similar parts in the several views:—Figure 1 is a vertical section through a portion of an elevator shaft showing the same conventionally and illustrating a cage equipped with the safety attachment. Fig. 2 is a bottom plan view of the cage showing the same operatively associated between the combined cage guide and rack members. Fig. 3 is a longitudinal section through one of the latches, parts being shown in elevation.

The cage 1 herein shown may be of any suitable well known construction, being slidable against and between combined guide and rack members 2 and having connected therewith in any suitable well known manner a hoisting cable 3. Guides 4 upon the corners of the cage are slidably associated with the members 2 as clearly shown in Fig. 2 of the drawing. The safety attachment comprises an actuating cable 5 and auxiliary cables 6, the former being extended over suitable guide pulleys 7 and 8 on the cage 1 and connected through the coupling sleeves 9 with the auxiliary cables 6 with the proper line of draft of the cable 5. An independent guide pulley 10, for each of the said cables 6, is carried by the elevator cage and disposed on the bottom thereof, and serves to change the direction of the cable coöperating therewith from the latch to the main cable of the safety attachment.

Latch devices including cylinders 11 are secured to the bottom of the cage 1 at the corners thereof and each has mounted therein a bolt 15 whose locking end is slidable in the head 14 of the casing and whose opposite end is provided with an eye 18 for attachment to one of the cables 6. Within the casing the bolt is provided with a stop 16 against which one end of an extensile spring 17 is engaged, the opposite end of the spring being seated against the opposite end of the casing so that under the tension of the spring the bolt will tend to move in one direction.

The coupling sleeve 12 which connects the cable 3 with the cable 5 is adjustable on the former whereby tension of the cable 5 can be regulated as the occasion may demand. A set screw 19 of the coupling may be brought to bear against the cable 3 whereby a fixed adjustment of said coupling is obtained. The lower terminal of the cable 5 is provided with an adjusting bolt 20 which has a nut 21 thereon to engage against the innermost coupling 9, the latter being free for sliding adjustments on the said lower terminal of the cable 5. The outermost coupling 9 carries a set screw 22 which may be engaged with the cable 5 so as to hold the outermost coupling immovable thereon. It is now evident that the couplings 9 and 12 may be adjusted so that the required adjustments of the cables 6 can be made to cause the locking bolts 15 to become operatively associated with the members 2.

The heads 14 of the latch casing are disposed directly opposite the inner locking surfaces of the members 2 so that the bolts 15 when projected will readily find locking purchase therewith. Under normal tension of the lifting or hoisting cable 3 of the cage the bolts 15 are held retracted. In event of breakage of the cable 3 or should the coupling sleeve 12 become disconnected from said cable the cable 5 will become slack and as a consequence and under the influence of the springs 17 the companion bolts 15 at the corners of the cage will be distended or projected to such positions that in due order they will be associated in adjacent passages 13 of the members 2 and thereby hold the cage positively locked against sliding movement.

I claim:—

In a safety attachment for elevators, guide members having locking surfaces, a cage disposed between the members and slidable thereagainst, a hoisting cable attached to and extending from the cage, a plurality of cables beneath the cage, movable latches located at the corners of the cage, springs for moving the latches in one direction and a cable connected with the said plurality of cables and having adjustable connection with the hoisting cable, an independent guiding element carried by the elevator cage for each of said plurality of cables, and each serving to change the direction of the cable coöperating therewith from the latch to the main cable of the safety attachment, the said plurality of cables being connected with the latches so as to normally hold them retracted under normal tension of the hoisting cable, the said bolts being adapted to engage with the locking surfaces when the bolts are projected.

In testimony whereof I affix my signature in presence of two witnesses.

OTTO VOLZ.

Witnesses:
LOUIS VOLZ,
A. A. PETERSON.

Copies of this patent may be obtained for five cents each, by addressing the "Commissioner of Patents, Washington, D. C."